Figure 4:
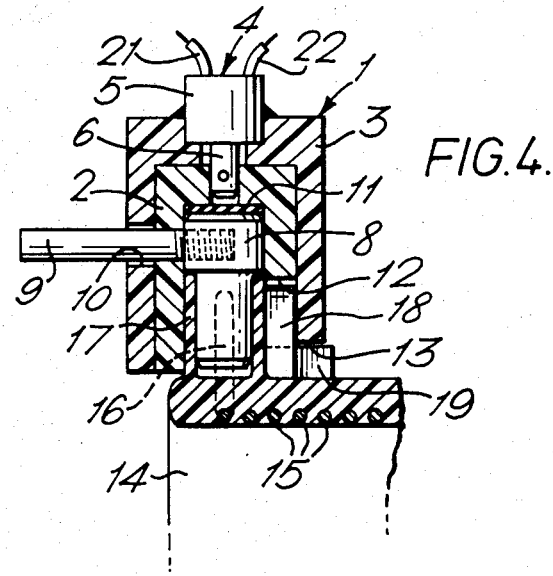

United States Patent [19]
Johnson

[11] Patent Number: 4,639,580
[45] Date of Patent: Jan. 27, 1987

[54] COUPLING DEVICES FOR USE WITH ELECTROFUSION FITTINGS OF THERMOPLASTIC MATERIAL

[75] Inventor: Alan Johnson, Sunderland, England

[73] Assignee: British Gas Corporation, London, England

[21] Appl. No.: 682,184

[22] Filed: Dec. 17, 1984

[30] Foreign Application Priority Data

Dec. 16, 1983 [GB] United Kingdom ............... 8333550

[51] Int. Cl.⁴ .............................................. H05B 3/08
[52] U.S. Cl. ..................................... 219/541; 219/544; 219/535
[58] Field of Search ....................... 219/535, 541, 544

[56] References Cited

U.S. PATENT DOCUMENTS 4,486,650 12/1984 Bridgstock et al. ................ 219/544

Primary Examiner—E. A. Goldberg
Assistant Examiner—M. M. Lateef
Attorney, Agent, or Firm—Larson and Taylor

[57] ABSTRACT

A coupling device (1) for use with an electrofusion fitting (14) so as to identify the fitting and to provide an indication of the period of time for which such fittings should be electrically energized to provide a satisfactory bond to thermoplastic pipes, the device comprising relatively rotatable parts (2) and (3) which are brought into register with fixed identification locations (18) and (19) on the fitting, and when in register automatically select an electrical parameter which is representative of that particular fitting and the energization period required.

12 Claims, 5 Drawing Figures

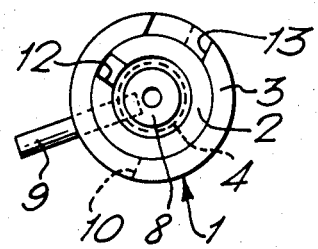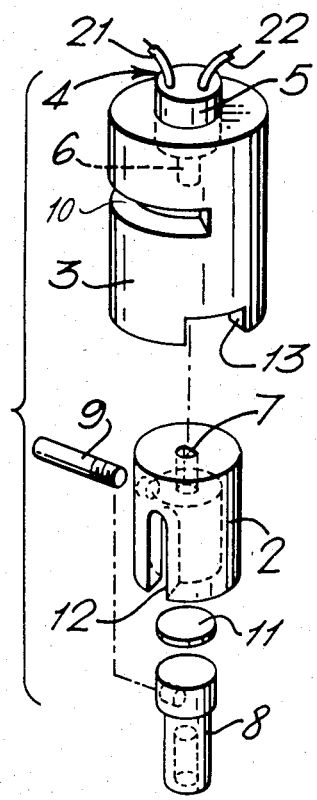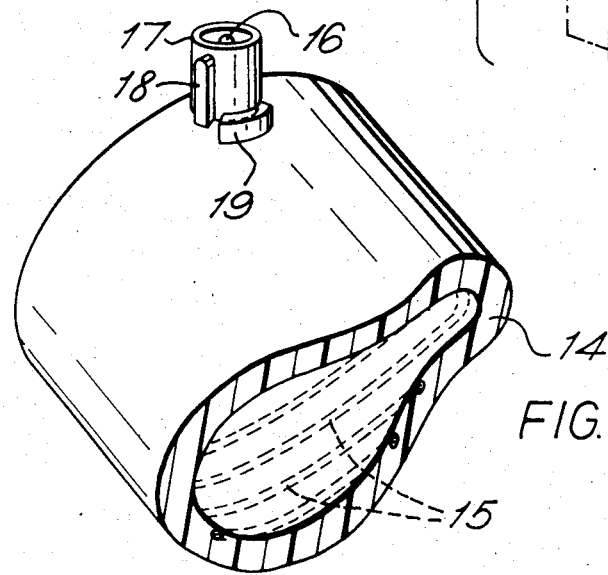

COUPLING DEVICES FOR USE WITH ELECTROFUSION FITTINGS OF THERMOPLASTIC MATERIAL

TECHNICAL FIELD OF THE INVENTION

This invention relates to coupling devices for use with electrofusion fittings of thermoplastic material to provide an indication of the period of time for which such fittings should be electrically energised to provide a satisfactory fusion bond to thermoplastic tubing or pipes.

BACKGROUND ART

In the installation of service pipes for the supply of fluids it is known to place over a length of pipe or over the ends of two lengths of pipe of thermoplastic material a respective tee-piece fitting or a tubular fitting of thermoplastic material having an integral electrical heating wire adjacent its inner surface and to energise the heating wire so that the material of pipe(s) and fitting become soft and form a welded fusion bond with each other. With such thermoplastic fittings it is important that the energising current is applied for the optimum time necessary to effect perfect fusion since applying the current for too short a time may result in a leaking joint while applying the current for too long a time may overheat and damage the fitting and also result in an unsatisfactory joint. An example of one such fitting is described in our copending UK Patent Application No. 2090558A.

In practice the fittings for use in quite different conditions and requiring quite different periods of energisation may be similar in appearance and therefore it is important that there is a reliable method of identifying them so that the correct energisation period can be selected and so that the energisation can be carried out automatically.

An object of this invention is to provide a coupling device for use with an electrofusion fitting of thermoplastic material to provide positive identification thereof.

DISCLOSURE OF THE INVENTION

According the the present invention a coupling device for use with an electrofusion fitting of thermoplastic material comprises, identifying means in the form of shaped portions carried by the fitting and arranged in a predetermined formation representative of that fitting; and separate connector means having indicator means selectively operable by said connector means when the connector means is brought into register with said identifying means so as to provide an indication of the identity of the fitting and the optimum period and/or value of electrical energisation of its resistance heating wire winding required for satisfactory electrofusion.

In the preceding paragraph and throughout the remainder of this specification the term "thermoplastic fitting" is used to connote not only fittings of suitable plastics materials but also fittings of low melting point metals and other materials between which a fluid-tight bond can be produced by the application of heat.

Conveniently, the identifying means may comprise first and second shaped portions formed integrally with the fitting; and the connector means may comprise a first member having means for selectively engaging said first shaped portion, and a second member movable relative to the first member and having means for selectively engaging said second shaped portion.

These shaped portions may be portions which project from an annular member formed integrally with the body of the fitting. Then the first and second projecting portions may be disposed in predetermined angular relationship to each other, possibly around the annular member.

In a preferred arrangement, the first member of the connector means could be an inner cylindrical member and the second member an outer tubular member mounted about the inner member for relative rotation thereto. Then the means on said inner and outer members for engaging the first and second projecting portions of the identifying means could be recesses.

The indicator means may be a suitable electrical element, for example, a variable resistance, capacitance, or reed switch device or a Hall-effect transducer device, arranged when selectively operated by the connector means to give an electrical output characteristic representative of that particular fitting. Preferably, the element will have two parts connected one to each of the first and second relatively rotatable connector members.

Preferably, the aforesaid annular member of the fitting body may be the annular shroud which usually surrounds a terminal post of the fitting heating winding, in which case a contact socket or plug for the supply of current to the terminal post could be mounted in said cylindrical member of the connector means.

In operation, the coupling device will be used in combination with an electronic circuit apparatus having contacts for connection to the or each electrical element in use with the fitting and adapted in use to sense the selected electrical characteristics of the element(s) and to act upon this information to determine and give an indication in any suitable manner of the time required for the application of a given electric current to the fitting heating winding to give a satisfactory electrofusion weld.

Figure 5:
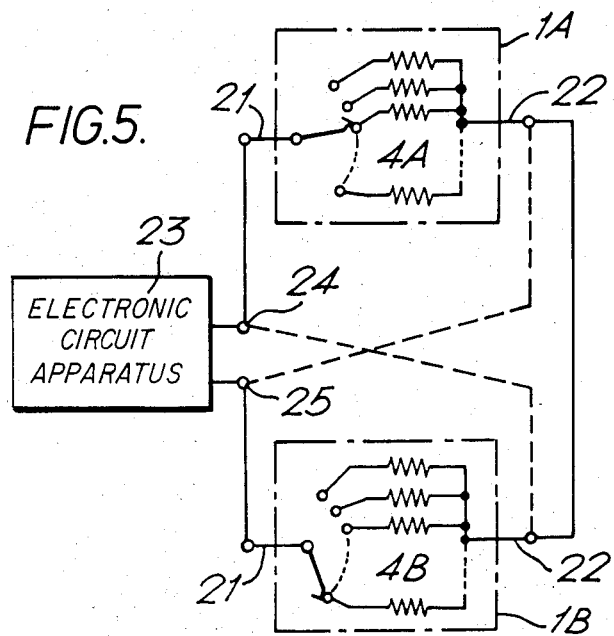

An embodiment of the invention will now be described by way of example with reference to the accompanying drawings in which:

FIG. 1 is an exploded perspective view of the parts constituting the coupling device in accordance with the invention, FIG. 2 is an underneath plan view of the coupling device, FIG. 3 is a fragmentary perspective view of one type of tubular electrofusion fitting in association with which the coupling device is used, FIG. 4 is a fragmentary sectional elevation of the coupling device connected to a fitting, and FIG. 5 is a diagram showing the manner in which the identifying coupler device or devices are used in combination with an electronic circuit control arrangement.

BEST MODES FOR CARRYING OUT THE INVENTION

Referring first to FIGS. 1 and 2, the coupling device 1 consists of an inner cylindrical member 2; an outer tubular member 3, both of electrically insulating material; an electrical element 4 (for example a selectively variable potentiometer, a multi-position multi-resistor switch, Hall-effect transducer device or reed-switch switch) whose body part 5 is fixed to the outer tubular member 3 and whose operating spindle 6 is secured in an aperture 7 in the end of the inner member 2; and a metal plug or socket 8 which is retained within the inner member 2 by a metal pin 9 which is fixed in the plug 8 and movably retained in a slot 10 formed in the outer member 3. The plug 8 is electrically insulated from the spindle 6 by a disc 11.

The inner member 2 is provided with a locating recess 12, and the outer member 3 has a locating recess 13. When assembled, the outer member 3 is rotatable with respect to the inner member 2 about which it is mounted and retained in position by the pin and slot connection 9, 10. Thus it will be seen that relative selective rotation of the members 2 and 3 will effectively operate the element 4 causing the selection, in this case, of a particular resistance value. The purpose of this will be explained later.

Referring now to FIG. 3, the electrofusion fitting shown is a tubular sleeve 14 of thermoplastics material having an electrical heating wire winding 15 embedded adjacent its inner surface. Each end of the winding is connected to a current supply terminal post 16 which is usually surrounded by an annular shroud 17 moulded in situ (only one terminal and shroud being shown). The current supply (not shown) for energising the winding 15 is connected to the posts 16 via the plug 8 and pin 9 on each coupling device.

Projecting from the external surface of the shroud 17 are two shaped step portions 18, 19 which are also moulded in situ in predetermined angular relationship to each other representative of that particular fitting. By this simple device, a reliable way is provided of identifying that particular fitting so that the correct energisation period of time can be selected for a satisfactory fusion bond with the pipe ends (not shown) to be joined together.

Referring also to FIG. 4, this shows the coupling device 1 in use with the fitting 14. The device is first positioned coaxially above the shrouded terminal post 16 and then lowered about the shroud 17 until the locating recess 12 of the inner member 2 engages the step portion 18 which is longer than the other step portion 19. With the inner member 2 (and hence the spindle 6) held stationary, the outer member 3 (and hence the switch body 5) is rotated until the locating recess 13 of the outer member 3 engages the step portion 19,. In this position a particular resistance value in the electrical element 4 will have automatically been selected by the angular registration of the members 2 and 3 with the identifying step portions 18, 19.

In practice, an operator will determine the correct period of time to energise the winding 15 of the fitting in one of two ways. Referring also to FIG. 5, the coupling devices will be used in combination with an electronic circuit apparatus 23. In the first way, the aforesaid automatically selected identifying resistance characteristic values of the elements 4A and 4B of separate coupling devices 1A and 1B used at both shrouded terminals of the fitting will be connected in series by their leads 21, 22 to the terminals 24, 25 of the apparatus 23, as shown in full lines. With the second way (shown in dotted lines), the automatically selected identifying resistance characteristic value, first from the element 4A of device 1A and then from the element 4B of device 1B, is separately connected to the terminals 24, 25 of the apparatus 23. In both cases the selected identifying characteristic resistance values will be measured by the apparatus 23 and, in known manner, will provide a computed indication of the energisation time required for the winding 15 of that particular fitting.

Depending on the number of different value resistors mounted in the body of the multi-switch element 4 and also which of the aforesaid ways of determining the energisation time period is chosen, a considerable number of combinations and permutations of different selected resistance measurements can be obtained. These combinations and permutations are, of course, directly related to the relative angular positions of the step portions 18 and 19 at each shrouded terminal of the fitting. The coarse resolution required by this system makes the electronics very simple and robust. Also the effects of contact resistance and temperature variations on resistance are negligible.

It will be understood that the embodiment described is just one example of many forms of construction that would obviously satisfy the fundamental concept of the present invention as defined in the present claims. For example, the coupling device 1 need not be applied to the terminal shroud 17 of the fitting; the location and manner of interengaging shaped portions 18, 19 and recesses 12, 13 could be different, for example, the shroud could be provided with slots or recesses and the connector with projecting portions or protusions so as to form an interengaging key and keyway arrangement. Also the kind and manner of operation of the electrical element 4 could be different.

I claim:

1. A coupling device for use with an electrofusion fitting of thermoplastic material comprising; identifying means in the form of shaped portions carried by the fitting and arranged in a predetermined formation representative of that fitting; and separate connector means having indicator means selectively operable by said connector means when the connector means is brought into register with said identifying means so as to provide an indication of the identity of the fitting and the optimum period and value of electrical energisation of its resistance heating wire winding required for satisfactory electrofusion.

2. A coupling device according to claim 1, wherein the identifying means comprises first and second shaped portions formed integrally with the fitting; and wherein the connector means comprises a first member having means for selectively engaging said first shaped portion, and a second member movable relative to the first member and having means for selectively engaging said second shaped portion.

3. A coupling device according to claim 1, wherein said shaped portions are portions projecting from an annular member formed integrally with the fitting body, the first and second projecting portions being disposed in predetermined angular relationship to each other.

4. A coupling device according to claim 2, wherein said first member of said connector means comprises an inner cylindrical member and said second member is an outer tubular member which is mounted about the inner member for relative rotation thereto; the means on said inner and outer tubular members for engaging the first and second projecting portions of the identifying means being recesses.

5. A coupling device according to claim 2, wherein the indicator means of said connector means is an electrical element arranged when selectively operated by said connector means to exhibit an electrical characteristic which is representative of that particular fitting.

6. A coupling device according to claim 5, wherein the electrical element has two parts connected one to each of said first and second relatively rotatable connector members.

7. A coupling device according to claim 6, wherein the electrical element is a selectively variable electrical resistance device.

8. A coupling device according to claim 6, wherein the electrical element is a selectively variable electrical capacitance device.

9. A coupling device according to claim 6, wherein the electrical element is a selectively variable Hall-Effect transducer device.

10. A coupling device according to claim 6, wherein the electrical element is a selectively variable reed-switch.

11. A coupling device according to claim 3, wherein said annular member of the fitting body is an annular shroud which surrounds a terminal post of the fitting heating winding; and wherein a contact plug for the supply of current to the terminal post is mounted in said cylindrical member of the connector means.

12. A coupling device according to claim 5, in combination with an electronic circuit apparatus having contacts for connection to the or each said electrical element in use with the fitting and adapted in use to sense said selected characteristics of the element(s) and to act upon this information to determine and give an indication of the time required for the application of a given electric current to the fitting heating winding to give a satisfactory electrofusion weld.

* * * * *